(No Model.)

J. H. CHATAIGNE.
SCALE FOR PRINTED MATTER.

No. 261,673. Patented July 25, 1882.

Witnesses.
N. W. Mortimer.
Jos L. Shaw.

Inventor.
J. H. Chataigne,
per
F. A. Lehmann,
Atty.

UNITED STATES PATENT OFFICE.

JOHN H. CHATAIGNE, OF RICHMOND, VIRGINIA.

SCALE FOR PRINTED MATTER.

SPECIFICATION forming part of Letters Patent No. 261,673, dated July 25, 1882.

Application filed April 17, 1882. (No model.)

*To all whom it may concern:*

Be it known that I, JOHN HENRY CHATAIGNE, of Richmond, in the county of Henrico and State of Virginia, have invented certain new and useful Improvements in Rules for Measuring Type; and I do hereby declare the following to be a full, clear, and exact description of the invention, such as will enable others skilled in the art to which it pertains to make and use it, reference being had to the accompanying drawings, which form part of this specification.

My invention relates to an improvement in rules for measuring type, but which is applicable to every use to which a rule or measure can be applied; and it consists in the combination of a rule having a groove in its center with one or more spring-slides, which catch in the groove and which can be adjusted in any desired position, as will be more fully described hereinafter.

The object of my invention is to produce a rule for measuring type by which any sized page of printed matter may be measured and calculated at once and retained for future reference, and by which any number of ems in one kind of type may be calculated in another.

Figure 1:
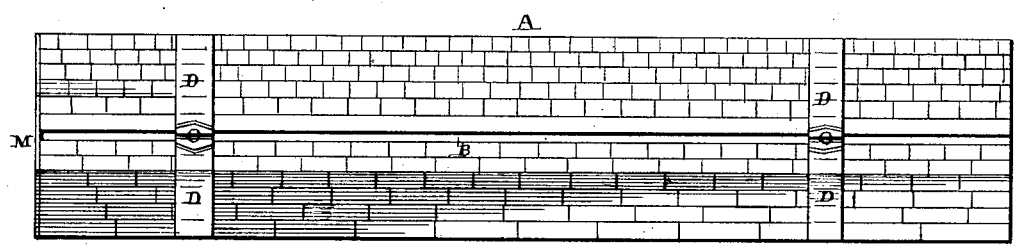
Figure 2:
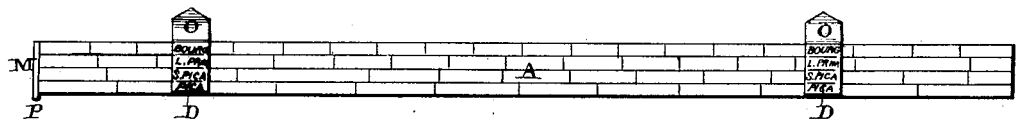
Figure 3:
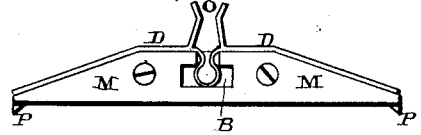

Figure 1 is a plan view of my invention. Fig. 2 is a side elevation of the same. Fig. 3 is an end view of the rule, showing the shape of the slides.

A represents a rule, preferably made of the shape shown, but which may be made of any other form that may be preferred. This rule is here made thickest at its central part, so that the groove B can be made in it to receive the spring portions of the slides D. This rule may be made from a single piece of material or from two or more parts, which are secured together. From a suitable distance upon each side of the groove the edges of the rule are beveled away, as shown, and these beveled parts, as also the top flat parts, are divided longitudinally by a series of parallel lines, so as to indicate the different kinds of type that are used. Each one of these spaces formed by the horizontal lines will be divided by lines which will indicate so many ems in each particular kind of type, while one of those horizontal lines which run parallel with the groove upon the flat portion of the rule, preferably next to the groove, will be divided off into inches, so as to indicate the length of any printed matter or any other article or thing which is to be measured.

The spring-slides D consist of a single flat plate which is bent so as to conform to the shape of the top of the rule, and which is bent, as shown, at its center, so as to form a spring which will catch in the groove, and then provided with two projections or handles, O; or two separate plates may be used and connected together at their inner ends by means of a spring. This spring, being shaped as shown, will press the outer ends of the plate or plates downward and outward with sufficient force to cause the spring to be held in place by frictional contact wherever it is adjusted. On the slides D, divided by parallel lines of same equal distance from each other as those on the rule, are placed the name of the different kinds of type indicated by measurement on the rule, so that in measuring the number of ems the name of type to be measured is immediately under the eye, the number measured and the name always coming together.

Upon one end of the rule will be secured the thin metallic plate M, which will have its ends formed into spurs or projections P, so as to catch over any object to which the rule is applied, or so as to serve as pointers or indicators when applied to measuring type, so that a very accurate measurement can be made.

There will be preferably two slides used with the rule, so that two separate and distinct measurements—the width and length—can be taken. As these two slides will remain in whatever position they are adjusted, the rule can be laid aside for the time being, and can be consulted at any time thereafter as a reference.

As the measures for the different kinds of type are placed side by side, the number of ems in any one kind of type in a certain amount of printed matter can be calculated in each one of the other kinds of type at a glance.

Having thus described my invention, I claim—

1. A rule shaped substantially as shown, and provided with a central groove, in combination with slides on which are the names of the different kinds of type, and which catch at its center in the groove, and are provided with suitable prongs or handles, by which the slides can be moved, substantially as shown.

2. The combination of a rule shaped substantially as shown, and provided with a groove at its center, with a metallic plate secured to one end of the rule, and which forms pointers or projections, and one or more spring-slides, which are adapted to catch in the central groove and be adjusted back and forth upon the rule, substantially as set forth.

In testimony whereof I affix my signature in presence of two witnesses.

JOHN HENRY CHATAIGNE.

Witnesses:
 JAMES HAYES,
 W. WASHINGTON.